3,101,306
RETICULATED POLYVINYL CHLORIDE AND METHOD OF MAKING SAME

Constant Georges Wippler, Epinay-sur-Orge, France, assignor to Compagnie de Saint-Gobain, Paris, France
No Drawing. Filed Mar. 24, 1958, Ser. No. 723,142
Claims priority, application France Apr. 11, 1957
17 Claims. (Cl. 204—154)

This invention relates to improved reticulated polyvinyl chloride and to a novel method of making it.

The invention has among its objects the provision of reticulated polyvinyl chloride having improved properties.

A further object is the provision of colorless reticulated polyvinyl chloride.

Still another object is the provision of a novel method of making reticulated polyvinyl chloride.

Yet a further object is the provision of an improved, simplified and easily controlled method of making colorless reticulated polyvinyl chloride.

The above and further objects of the invention will become more apparent as the description of the invention proceeds. It is to be understood that the invention is not restricted to the specific examples given in the specification by way of illustration, but is to be defined by the scope of the claims appended hereto.

It is frequently desired to change the bonds between the vinyl chloride units in polyvinyl chloride from the usual straight chain bonds so that at least some of the chains are cross linked. Such action is sometimes called "cross linking" or "reticulation." The latter term will be employed herein, and the product resulting from such process will be denominated as "reticulated."

When polyvinyl chloride powder is exposed to the action of ionizing radiation either in the air or in a vacuum, as, for example, by being so exposed to the radioactive discharge from a radio-cobalt source, it undergoes either degradation followed by a small degree of reticulation or only a very small reticulation respectively. Such small reticulation is also obtained when the polyvinyl chloride is subjected to a relatively high intensity of gamma radiation and is not sufficient to substantially lower the solubility of the polyvinyl chloride in its usual solvents. In addition to degrading the polyvinyl chloride, ionizing radiation also produces undesirable coloration of the product. Such coloration, which ranges from yellow to dark violet, depending upon the dose or total quantity of radiation to which the product has been subjected, decreases the market value of the product.

The method of the present invention, on the other hand, permits polyvinyl chloride to be reticulated to the desired extent, from a small to a very high degree, without causing degradation of the product, and without causing it to undergo any change in coloration.

The method of the invention consists in subjecting to the action of high energy ionizing radiation while in contact with an oxygen-containing gas polyvinyl chloride which has first been swelled in an organic solvent which forms peroxide groups spontaneously upon contact with air. The total amount of ionizing radiation is varied, by varying the intensity of radiation and/or the time during which the polyvinyl chloride is irradiated, so as to produce the desired degree of reticulation of the product.

The high energy ionizing radiation may be, for example, accelerated electrons, neutrons, etc. When the polyvinyl chloride is in powder form, it is preferred to mix it with a swelling organic solvent which forms peroxide groups spontaneously in air, such solvent being a non-polymerizable material. Typical of solvents useful in the method of the invention are tetramethylene oxide (tetrahydrofurane), $C_4H_8O$; dioxane, $C_4H_8O_2$; and tetralin (tetrahydronaphthalene), $C_{10}H_{12}$.

When thus treated in accordance with the invention the resulting polyvinyl chloride is not degraded but heavily reticulated, the reticulation being almost complete even when it is irradiated only moderately in the presence of air. Furthermore, the polyvinyl chloride as thus produced, regardless of its degree of reticulation, is colorless. When the solvent is eliminated from the irradiated mixture, as by slowly evaporating such solvent, the product has practically the same appearance as ordinary untreated polyvinyl chloride, but has improved physical and chemical properties.

It is believed that absorption or occlusion of the peroxide groups (—O—O— or $=O_2$) derived from the molecules of the solvent is the primary cause of the increased reticulation of polyvinyl chloride. The irradiation probably starts a small amount of breaking down of the polymeric chain of the polyvinyl chloride, releasing hydrochloric acid and forming reactive double bonds. Such broken chains can then bond themselves to other polymeric chains due to the presence of the peroxide groups from the solvent, thus causing reticulation of the polyvinyl chloride.

Experiments show that the described reticulation may be achieved using a wide range of concentration of organic swelling solvent, extending from the concentration which does not affect the appearance of the product to be reticulated to the concentration which permits its complete solubilisation.

The following examples, given simply for illustration, are not to be taken as limiting the invention.

Example I

One gram of polyvinyl chloride powder having a molecular weight of 90,000 and an intrinsic viscosity of 81 cm.³/gr. (as defined by Kraemer, Ind. Chem. 30, p. 1200 (1938)) was mixed and swelled with 5 cm.³ of tetramethylene oxide ($C_4H_8O$) to form a viscous solution having the consistency of a tacky paste. Such mixture was subjected in the presence of air to irradiation from radio-cobalt having an intensity of 60 curies, the source of radiation being spaced 30 mm. from the mixture. The mixture was subjected to a total irradiation of 30 megaroentgens at a rate of 67,500 roentgens per hour.

Such irradiation made the polyvinyl chloride-solvent mixture elastic, and gave it the appearance of a colorless rubberlike substance dry to the touch. The solvent was slowly evaporated at ordinary room temperature. The material remaining after elimination of the solvent was transparent, clear, relatively rigid, and practically insoluble in the cold in the usual organic solvents for polyvinyl chloride.

Tests prove that 80% of the resulting material had become reticulated, the remaining 20% being soluble in tetramethylene oxide.

Example II

This experiment was carried out with the same materials and under the same conditions as in Example I, with the exception that the mixture of polyvinyl chloride and tetramethylene oxide was subjected to a total dose of irradiation in the amount of 160 megaroentgens.

Tests of the resulting material, after elimination of the tetramethylene oxide, show the resulting material to have been 95% reticulated, only 5% of the product being soluble in tetramethylene oxide in the cold. The resulting material had the same color as the polyvinyl chloride used as a starting material, in spite of the greatly increased total amount of irradiation employed.

By way of contrast, there are now given the results of experiments wherein polyvinyl chloride was reticulated by methods other than that of the present invention.

One gram of polyvinyl chloride having the same molecular weight and intrinsic viscosity as in Example I was subjected to a total irradiation of 30 megaroentgens at a rate of 67,500 roentgens per hour. As before, the source of radiation was radio-cobalt having an intensity of 60 curies, placed at a distance of 30 mm. from the sample.

After the polyvinyl chloride had been irradiated, the molecular weight and the viscosity of the resin were determined. It was found that the molecular weight of the resin had fallen to 70,000 and the viscosity had fallen to 64 cm.$^3$/gr., which demonstrated that the product had been markedly degraded.

When the experiment was repeated to subject polyvinyl chloride to a total of 160 megaroentgens of irradiation, it was found tht the molecular weight of the product had increased to 96,000, but that its intrinsic viscosity had fallen to 43 cm.$^3$/gr. This showed that a very small amount of reticulation had followed the degradation of the resin. During the course of the irradiation the resin was observed to become lightly colored. When the irradiated resin was dissolved in a conventional solvent, the resulting solution had an intensely red color.

Depending upon the duration and the intensity of the irradiation, resins may be prepared in accordance with the invention having different desired physical and chemical properties, including the degree of reticulation obtained. Resins which are highly reticulated cannot practically be further worked in a roll mill. The treatment in accordance with this invention of articles, made of polyvinyl chloride is thus ordinarily carried out after the article has been shaped or formed. The method may be employed with all forms of polyvinyl chloride. Experiments show that it is preferable, to facilitate the wetting of the polyvinyl chloride by the solvent, the irradiation of the polyvinyl chloride, and the final elimination of the solvent, to utilize the polyvinyl chloride in the shape of thin sheets, films and the like.

Also in accordance with the present invention the polyvinyl chloride may be irradiated only sufficiently to produce a relatively small degree of reticulation for example on the order of 5 to 20%. Such irradiation may be carried out by subjecting the resin to relatively weak sources of irradiation for relatively short periods of time. With such relatively small degree of reticulation, the resins remain workable or shapeable after treatment. Such products, however, possess improved properties as compared to those which had not been subjected to irradiation by this process.

Example III

According to the method of Example I, using dioxane as the organic solvent to swell the polyvinyl chloride, and using a total irradiation of 30 megaroentgens, the amount of reticulation obtained is 72%.

The reticulated material is colorless.

Example IV

According to the method of Example I, using tetralin to swell the polyvinyl chloride, and a total irradiation of 30 megaroentgens, the amount of reticulation obtained is about 36%. When a total irradiation of 160 megaroentgens is effected, the amount of reticulation obtained is 40%.

The reticulated material is colorless.

It will be observed by the results of Example II that products having low reticulation of 5–20% have been made by this process. By reference to Examples I to IV it is seen that products in all ranges over 20% reticulation have been made, and that products having over 35% and over 70% have been made.

Although only a limited number of embodiments of the invention have been described in the foregoing specification, it is to be expressly understood that various changes may be made therein without departing from the spirit and scope of the invention as will now be apparent to those skilled in the art.

What is claimed is:

1. The method of preparing uncolored reticulated polyvinyl chloride, which comprises mixing polyvinyl chloride with a non-polymerizable organic solvent, which swells the polyvinyl chloride and which forms peroxide groups spontaneously upon contact with air, and subjecting such mixture to the action of high energy ionizing radiation in the presence of an oxygen-containing gas until at least 5% reticulation has occurred.

2. The method defined in claim 1, comprising varying the degree of reticulation of the polyvinyl chloride by varying the amount of irradiation of the mixture.

3. The method defined in claim 1, wherein the organic solvent is tetramethylene oxide.

4. The method defined in claim 1, wherein the organic solvent is dioxane.

5. The method defined in claim 1, wherein the organic solvent is tetralin.

6. The method defined in claim 1, wherein the ionizing radiation is derived from a source of radio-active discharges.

7. The method defined in claim 1, comprising removing the solvent from the mixture after the subjection of the mixture to ionizing radiation.

8. The method defined in claim 7, comprising slowly drying the irradiated mixture to remove the solvent therefrom.

9. The method of claim 1 in which the radiation was provided by a source about equivalent to at least 60 curies operating for a period of time sufficient to form at least 5% reticulation.

10. The method of claim 9 in which the radiation period is sufficient to form at least 20% reticulation.

11. The method of claim 9 in which the radiation period is sufficient to form at least 35% reticulation.

12. The method of claim 9 in which the radiation period is sufficient to form at least 70% reticulation.

13. The method of preparing uncolored reticulated polyvinyl chloride, which comprises forming polyvinyl chloride into a thin sheet, moistening the surface of the sheet with a non-polymerizable organic solvent, which swells the polyvinyl chloride and which forms peroxide groups spontaneously upon contact with air, and subjecting such mixture to the action of high energy ionizing radiation in the presence of an oxygen-containing gas until at least about 5% reticulation has occurred.

14. The method defined in claim 13, comprising slowly drying the irradiated sheet to remove the solvent therefrom.

15. The method of preparing an article of reticulated polyvinyl chloride that comprises the steps of shaping polyvinyl chloride to form the article, soaking the article in a non-polymerizing organic solvent that forms peroxide groups on exposure to air until the article swells, and irradiating the article with high energy, ionizing radiation in an oxygen-containing gas, with a dosage sufficient to achieve a degree of reticulation of at least 5%.

16. The method of claim 15 in which the degree of reticulation is above about 70% and the dose employed at least 30 megaroentgens.

17. In the reticulation of polyvinyl chloride with high energy ionizing radiation in an oxygen containing gas the step that comprises swelling the polyvinyl chloride in an organic solvent which is not polymerizable and which yields a peroxide group on exposure to the air before irradiating the polyvinyl chloride with high energy, ionizing radiation until at least 5% reticulation has occurred.

References Cited in the file of this patent

UNITED STATES PATENTS 2,427,070    Reuter ------------------ Sept. 9, 1947

FOREIGN PATENTS 714,843    Great Britain ------------ Sept. 1, 1954
732,047    Great Britain ------------ June 15, 1955

OTHER REFERENCES

Harrington, "Plastics and Elastomers for Use in Radiation Fields," Nov. 30, 1956, pp. 6, 7, 29 and 40.